United States Patent

Rieger et al.

[11] Patent Number: 5,897,225
[45] Date of Patent: *Apr. 27, 1999

[54] WATERTIGHT PHOTOGRAPHIC SINGLE-USE CAMERA HAVING ELASTIC POLYMER SEAL

[75] Inventors: Albert Rieger, Unterboehringen, Germany; David Barclay, Bergen; Steven Chapman, Corfu, both of N.Y.; Heinz-Andreas Kellner, Stuttgart; Michael Reibl, Boeblingen, both of Germany; James G. Rydelek, Henrietta, N.Y.; Andreas Schweizer, Bad Ditzenbach, Germany

[73] Assignee: Eastman Kodak Company, Rochester, N.Y.

[ * ] Notice: This patent is subject to a terminal disclaimer.

[21] Appl. No.: 08/799,586

[22] Filed: Feb. 10, 1997

[30] Foreign Application Priority Data

Feb. 22, 1996 [DE] Germany ............................ 196 06 529
Oct. 21, 1996 [DE] Germany ............................ 196 43 333

[51] Int. Cl.⁶ .................................................. G03B 17/08
[52] U.S. Cl. .............................................................. 396/29
[58] Field of Search ................................... 396/25, 27, 29

[56] References Cited

U.S. PATENT DOCUMENTS

| | | | |
|---|---|---|---|
| 4,244,591 | 1/1981 | Umetsu . | |
| 4,882,600 | 11/1989 | Van de Moere . | |
| 5,131,778 | 7/1992 | Asai et al. . | |
| 5,285,894 | 2/1994 | Kamata et al. | 396/27 X |
| 5,532,315 | 7/1996 | Bonekamp et al. | 525/71 |
| 5,563,674 | 10/1996 | Von Holtz et al. . | |
| 5,615,394 | 3/1997 | Albrecht | 396/6 |
| 5,643,390 | 7/1997 | Don et al. | 156/307.1 |

FOREIGN PATENT DOCUMENTS 56-142519 11/1981 Japan .
2 255 416 10/1994 United Kingdom .

OTHER PUBLICATIONS

C. Jaroschek and W. Pfleger, "Harte und weiche Kunststoffe beim Spritzgieben kombinieren", Jun. 1994, vol. 84, No. 6, pp. 705, 706, 708, 709, 710.

Primary Examiner—Howard B. Blankenship
Attorney, Agent, or Firm—Robert Luke Walker

[57] ABSTRACT

A watertight photographic single-use camera having a first and a second body shell that join together. The body shells comprise rigid polymer material and are adapted to receive a film transport device, a lens, a flash unit and a viewfinder. The first body shell forms the camera front section and the second body shell forms the camera rear section. A sealing means comprising an elastic polymer material is attached to an edge of at least one body shell that forms a joint and to at least one edge that forms a body opening. The elastic polymer material is attached by a multiple-component injection molding process and is connected to the body shell by chain looping (molecular entanglement) of the polymer material. As a result, the camera is dependably sealed against water and yet is inexpensive and simple to produce. For simple recyclability, the body shells can be crushed using known devices without separation of the polymer materials, with the resultant material mix being usable as a feedstock for the manufacture of new camera components.

17 Claims, 4 Drawing Sheets

WATERTIGHT PHOTOGRAPHIC SINGLE-USE CAMERA HAVING ELASTIC POLYMER SEAL

CROSS-REFERENCE TO RELATED APPLICATION(S)

Reference is made to commonly assigned co-pending U.S. patent application Ser. No. 08/799,556, entitled: WATERTIGHT BODY FOR ACCOMMODATING A PHOTOGRAPHIC CAMERA, and filed in the names of Albert Rieger, David Barclay, Steven Chapman, Heinz-Andreas Kellner, Michael Reibl, James G. Rydelek, and Andreas Schweizer each of which are assigned to the assignee of this application.

FIELD OF THE INVENTION

The invention relates to cameras and more particularly relates to a watertight photographic camera having a first and a second body shell of rigid polymer material that can be joined together for accommodating a film transport device, a lens, a flash unit and a viewfinder.

BACKGROUND OF THE INVENTION

Photographic cameras are known which are sealed against external influences such as sand, moisture, etc., or against water. U.S. Pat. No. 4,882,600, DE 28 23 607, DE 31 12 875 and DE 42 12 845, disclose cameras of this type, sometimes of watertight configuration. A photographic camera which is not watertight but is sealed against sand and moisture is described in DE-A1-44 14 854.

The joint resulting in the assembled condition of the camera body is here mostly sealed using separate elastic sealing elements, for example O-rings, gaiter-like rubber elements, sealing means etc. to avoid these influences.

DE 31 12 875 describes a watertight camera with a seal configuration where a filler is cast as a sealing element into the joints formed between stationary outer components of the camera. The filler is in a liquid state before casting and hardens when in place.

Furthermore, DE 42 12 845 describes a watertight camera having a rear wall opening and shutting on a hinge and sealed off from the camera body by a circumferential seal. A further seal used for sealing an adjuster for the viewfinder is attached to the movable rear wall of the camera and is in sealing contact with the camera body.

Configurations of this type are marked by separate individual parts that first have to be joined together, so that the manufacture of a watertight photographic camera is time, material and cost intensive.

For photographic cameras, watertightness is, for example, achieved by an all-round body. Removing the film from these cameras is very complex, since first the outer body has to be opened and the camera removed. Only then can the camera enclosure, generally of cardboard, be opened and the film removed.

A camera which is sealed against moisture, sand and dust and can thus be handled under normal conditions, can be created using simple means. However, if such a camera is to ensure watertightness, i.e. is to allow usage under water as well, a considerable amount of time, material and money is required for the construction and manufacture.

It would thus be desirable to provide a watertight photographic camera that is of simple design, protects against dust and moisture in normal usage, and ensures dependable watertightness when the camera is used underwater. It would also be desirable to provide for simple removal of film and batteries after complete exposure of a film as well as inexpensive recyclability of the used camera body.

SUMMARY OF THE INVENTION

The invention is defined by the claims. The invention, in its broader aspects, provides a watertight photographic single-use camera having a first and a second body shell that join together. The body shells comprise rigid polymer material and are adapted to receive a film transport device, a lens, a flash unit and a viewfinder. The first body shell forms the camera front section and the second body shell forms the camera rear section. A sealing means comprising an elastic polymer material is attached to an edge of at least one body shell that forms a joint and to at least one edge that forms a body opening. The elastic polymer material is connected to the body shell by chain looping (molecular entanglement) of the polymer material. As a result, the camera is dependably sealed against water and yet is inexpensive and simple to produce. For simple recyclability, the body shells can be crushed using known devices without separation of the polymer materials, with the resultant material mix being usable as a feedstock for the manufacture of new camera components.

BRIEF DESCRIPTION OF THE FIGURES

The above-mentioned and other features and objects of this invention and the manner of attaining them will become more apparent and the invention itself will be better understood by reference to the following description of an embodiment of the invention taken in conjunction with the accompanying figures wherein.

DESCRIPTION OF PARTICULAR EMBODIMENTS

Figure 1:
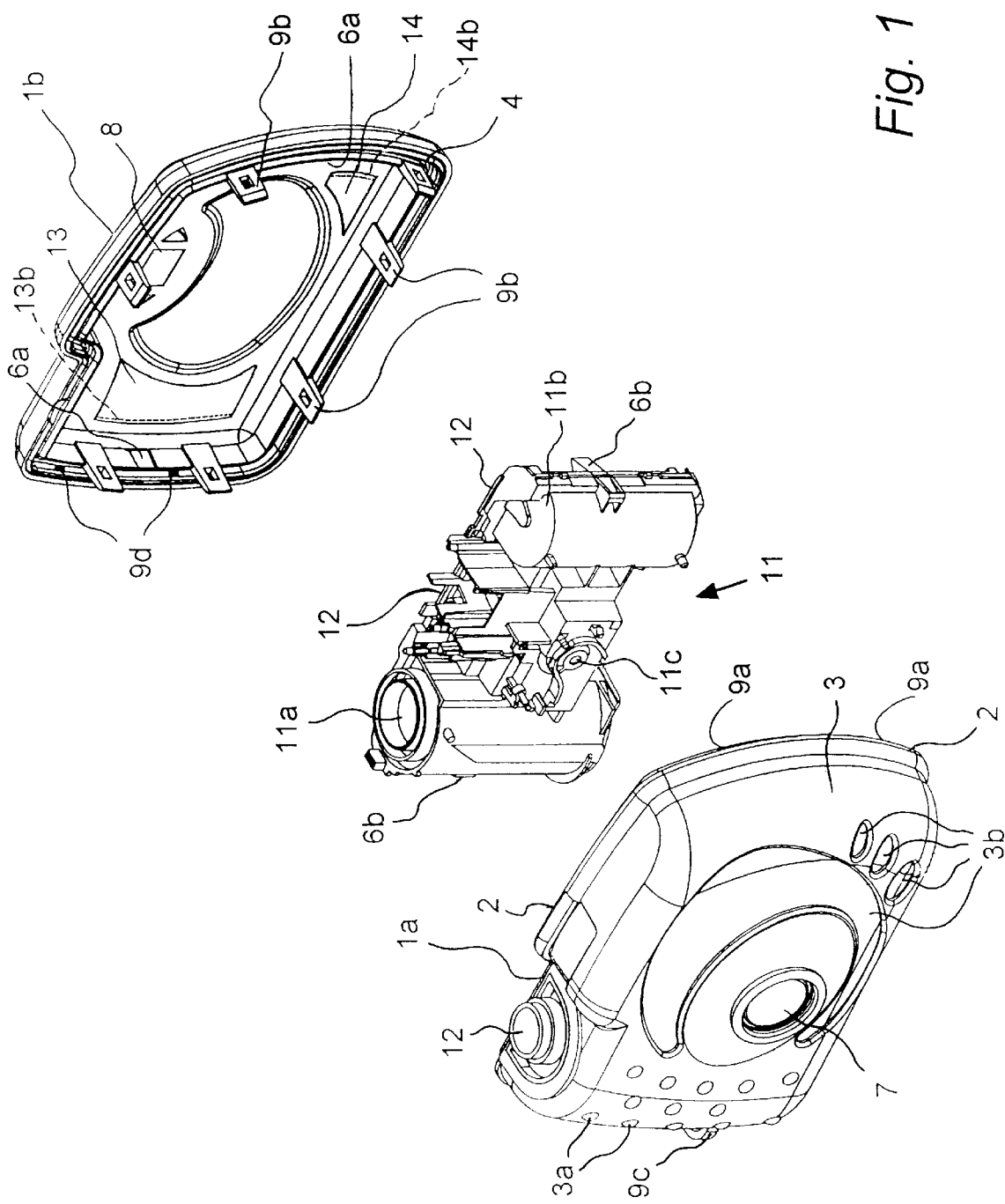
FIG. 1 shows the body in accordance with the invention in an exploded view.
Figure 2:
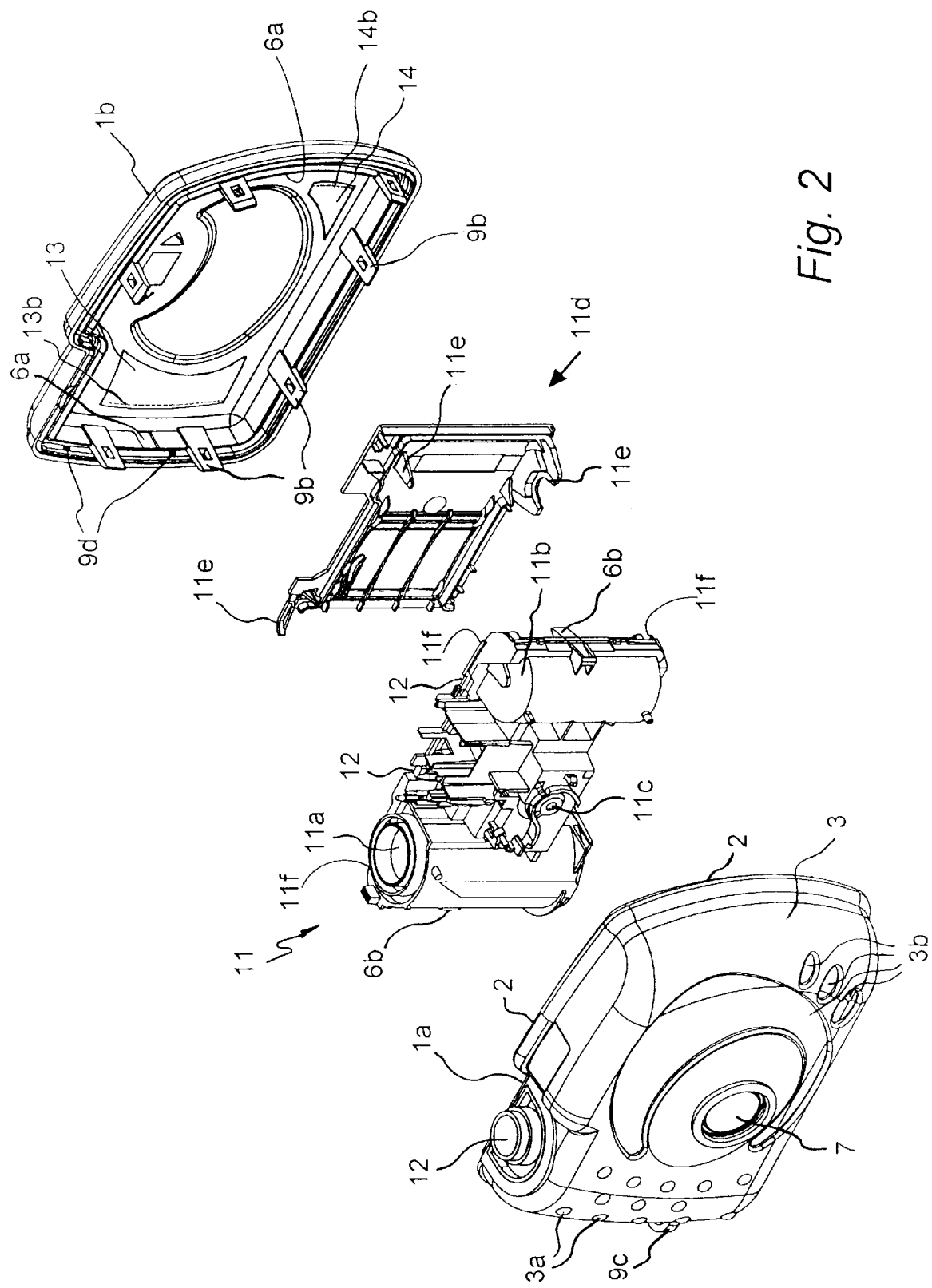
FIG. 2 shows the camera in a further embodiment in an exploded view.

The watertight photographic single-use camera comprises a front body shell $1a$ and a rear body shell $1b$ for accommodating a frame 11, as shown in diagrammatic form in FIGS. 1 and 2. The frame 11 is of light-tight configuration, for example by suitable blackening, and is provided with a film winding compartment and film cartridge compartment $11a$, respectively, a film supply chamber $11b$, an opening $11c$ for the shutter, etc. By means of engaging elements or means 12 forming an integral unit with the frame 11, the latter can be connected in light-tight manner to the rear body shell $1b$. The engaging means 12 are formed by webs which are arranged on the frame 11 in a labyrinth-like fashion (not illustrated) and engage with corresponding recesses in the body shell $1b$. The frame 11 and the body shell $1b$ thus form the light-tight space for the film.

Both body shells $1a$ and $1b$ consist of a rigid polymer material, preferably a polystyrene, with the front body shell 1a being optically transparent and the rear body shell 1b being designed light-tight. Both body shells 1a and 1b are firmly connectable by locking means 9a and 9b. The locking means comprise the locking hooks 9a formed in one piece with the body shell 1a, and the elastically flexible locking strip 9b formed in one piece with the body shell 1b. In the assembled state of the body shells, the locking means 9a, 9b are covered by the body walls and are hence not accessible for unlocking. To that end, at least one marked wall area 9d is provided on the body shell 1a that can be cut through using a tool, for example a screwdriver, to unlock at least one of the engaged means 9a and 9b. This is achieved by providing in the wall areas 9d openings in the body shell 1a which are closed only by the thermoplastic covering means 3. Furthermore, an opening 20 is provided in the body shell 1b for fitting a viewfinder 8.

Figure 3:
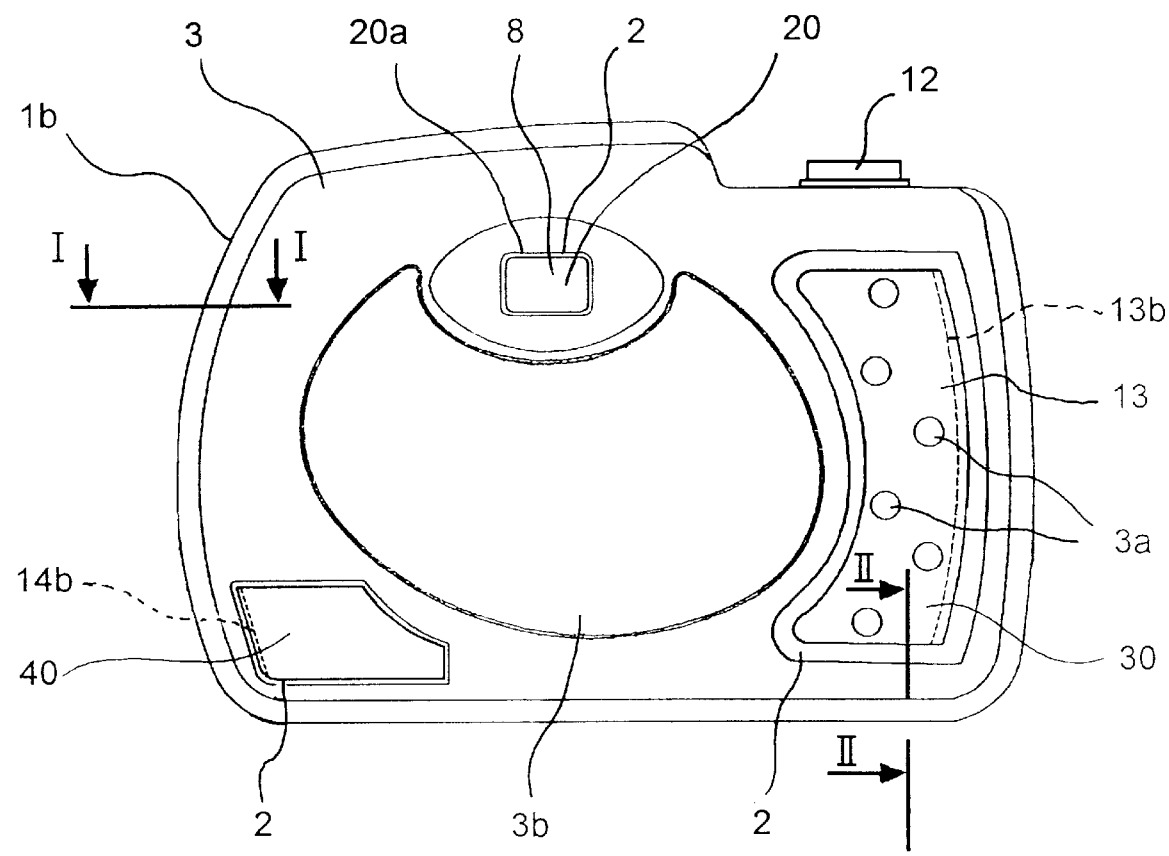
FIG. 3 shows the camera in a rear view.
Figure 6:
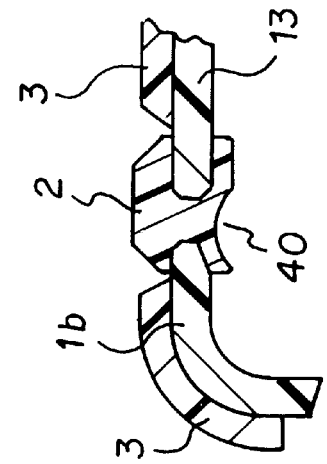
FIG. 6 shows a shutter cover in a diagrammatic sectional view along the line II—II in FIG. 3.
Figure 5:
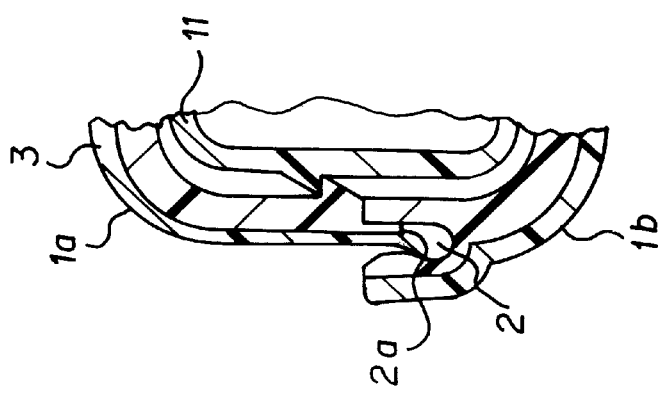
FIG. 5 shows the watertight closed camera body in a diagrammatic sectional view in the area of the body joint along the line I—I in FIG. 3.
Figure 4:
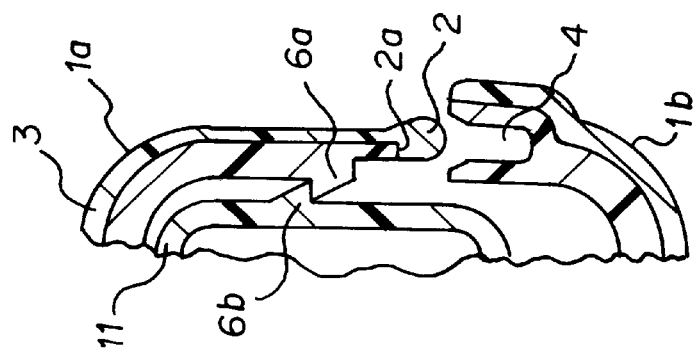
FIG. 4 shows the opened camera body in a diagrammatic sectional view in the area of the body joint along the line I—I in FIG. 3.

As shown in FIG. 3, the body shell 1b forming the camera rear section has body openings 30 and 40 having shutter covers 14 and 13 associated with the battery compartment and the film winding compartment and film cartridge compartment, respectively. The shutter covers 14, 13 are hinge-connected to the body shell 1b by means of film hinges 14b and 13b. To remove a film once it has been fully exposed or to remove the battery, rapid access is therefore possible by destroying the seals described in the following and arranged between the shutter covers 13 and 14 and the body shell 1b.

On the body shell 1a, a sealing means or sealer 2 has a droplet shaped cross-section and consists of a thermoplastic elastomer, styrene-butadiene (ISO designation: TE(PEBBS+PP). The sealing means is provided on the edge 2a, which forms or defines a join of the body, between the shells. The sealing means can be pressed into a groove 4 encircling the body shell 1b. In the pressed-in and assembled state of the body shells, respectively, watertightness is already achieved by an overdimensioning of the droplet-shaped sealing means 2 in comparison with the groove 4, without the aforementioned locking means 9a and 9b having to be connected to one another. Since the resetting forces of the sealing means act vertically to the joint, no further force is necessary to keep the body shells together in the unloaded state.

The sealing means 2 is also provided on an edge 20a forming the viewfinder opening 20 into which the optically transparent viewfinder can be pressed in a watertight manner.

In a further embodiment, a covering means or covering 3 is provided on the outer surfaces of one or both body shells 1a, 1b. The covering means is a thermoplastic elastomer like the sealing means. The sealing means 2 is provided in its further modification on the outer surfaces of both body shells 1a and/or 1b as a covering means 3. The latter has, for improvement of the grip, areas 3a that are designed raised. Areas 3b free of covering means further improve the grip qualities by virtue of the resultant differing surface heights. The areas 3b, for example around the lens, carry an informative or decorative label. For carrying the camera, a carrying means or carrier 9c designed as a lug for suspension of a carrying strap or the like is provided and is designed in one piece with the covering means 3.

A free surface 16 can be provided in an area around the lens, which is not covered by the covering layer and on which a C-shaped information plate is arranged on the inside of the body. With an optically transparent body shell 1a, the information on the plate is readable from the exterior of the body. Between the lens 7 and the inner edge formed by the C-shaped plate, a non-transparent cup 17 is provided which encloses the lens and can be made of a thermoplastic elastomer. The C-shaped surface 16 and the information plate are configured such that they partially enclose the non-transparent cup 17.

The body shells 1a and 1b, the sealing means 2, the covering means 3 and 3a, and the carrying means 9c are made in a multiple-component injection molding process, in particular a two-pack process, such that looping of the molecule chains results between the two polymer materials. In a first injection molding step, the body shell 1a is made from polystyrene and in a second step, without a change of the mold, the styrene-butdiene sealing means 2, covering means 3 and 3a and carrying means 9c are provided. The manufacture of the body shell 1b from polystyrene is achieved similarly, with the styrene-butadiene elastomer now not being applied to the edge 2a; instead the edges 13a, 14a of the shutter covers 13 and 14 are covered with the sealing means 2, as shown in FIG. 3. At the same time, the covering means 3 and 3a are applied and the sealing means 2 is applied to the edge 20a of the opening 20 for the viewfinder 8. This seal has an undercut to simplify pressing in of the viewfinder into the seal. In a further embodiment in accordance with the invention, the viewfinder is inserted into the tool mold before the application of the thermoplastic elastomer and connected to the body shell 1b in watertight manner using the injection molding operation for application of the sealing means 2. The viewfinder 8 is can also thus be aligned with a C-shaped information plate provided with a viewfinder window.

The covering means 3 and 3a are best restricted to certain surface areas improving the grip on the camera, but can also comprise the entire outer surface with the exception of the opening for the lens 7, the viewfinder 8, the opening for the flash unit and the areas 3b. By adding suitable colorants, the body can be colored to achieve light-tightness or can be left transparent.

For the body shells 1a, 1b and for the sealing, covering and holding means 2, 3, 3a, 5 and 9c, polycarbonate/polyurethane can also be used in addition to the material combination already stated of polystyrene/styrene-butadiene.

An actuating means 12, comprising a thumbwheel having an integrated release button for film transport and for release, is connected to the body shells in watertight form. To that end, the body shells have a fully cylindrical opening with a shaped collar for accommodating a sealing element and for supporting the thumbwheel, which however is not shown in the drawing. The release button designed as a watertight rubber diaphragm release transmits in known manner the release movement by means of a plunger to a release lever arranged inside the camera (also not shown).

In a further embodiment, shown in FIG. 2, the frame 11 is connectable in light-tight manner to a rear section 11d using engaging elements 11e and 11f, in particular using the means 12. The latter are formed by webs arranged in labyrinthine form (not shown) on the frame 11 and engaging in corresponding recesses in the rear section 11a. The frame 11 and the rear section 11d therefore form the light-tight area for the film. Accordingly the body shells 1a and 1b forming the camera front and rear sections comprise an optically transparent polystyrene or polycarbonate whose outer surfaces can be variably designed using the means already described.

After complete exposure of the film, the body 10 is opened using a tool, as already described, and both body shells are conveyed to a device known per se for crushing, for example a shredder, without separation of the materials. The resultant material granulate mixture can be used as a feedstock for making new light-impermeable camera components by injection molding, where exclusively the material combination polystyrene/styrene-butadiene is used for the body shells 1a and 1b and for the sealing, covering and holding means 2, 3, 5 9c. The crushed body feedstock is preferably used in an admixture with a feedstock of new polystyrene material for injection molding, at a maximum of 25 parts by weight of crushed body feedstock to 100 parts by weight of new polystyrene material.

It is within the framework of the invention that the photographic single-use camera can also be achieved without openings 30 and 40 for the stated shutter covers 13 and 14.

It is an advantageous effect of the present invention that a watertight photographic camera is provided that is of simple design and ensures dependable watertightness. A further advantageous effect is that the watertight photographic camera can provide for simple removal of film and batteries after complete exposure of a film as well as inexpensive recyclability of the used camera body.

Due to the fact that a first body shell forms the front section of the camera and a second body shell the rear section and that a sealing means consisting of an elastic polymer material, in particular a thermoplastic elastomer, is applied by a multiple-component injection molding process to an edge of at least one body shell that forms the joint and is connected to the body shell by chain looping of the polymer materials, a watertight single-use camera can be provided that manages without additional and separately attached sealing elements. The adhesion of the sealing means in accordance with the invention is achieved by the chain looping of the molecules between the material of the body shell and that of the sealing means during injection molding. Additional adhesion connectors, such as adhesives or the like, are not necessary.

Advantageously, the sealing means is of droplet shape on the edge of the first body shell, with the second body shell having a circumferential groove in which the sealing means is deformed in the assembled state of the body shells such that the camera body is watertight. Thanks to a bumper-like design of the second body shell in the area of the encircling seal, the latter is well protected against mechanical effects, such as knocks etc.

To lock and seal the viewfinder, a body opening for that purpose is provided with the thermoplastic sealing means around its edge, said means having an undercut associated with the edge of the viewfinder.

In a further advantageous modification of the invention, shutter covers are associated with the body openings provided in the area of a film cartridge chamber, battery compartment or the like and are hinge-connected on one side to a body shell by means of an appropriate film hinge.

A covering means provided by multiple-component injection molding on the outer surfaces of the body shells is also connected to them by chain looping. By a suitable color additive to the elastomer, a camera body that can be advantageously designed is achievable. Raised areas of the covering means and areas free of the latter ensure in addition a good grip on the camera under water. A carrying means designed as a lug for attachment of a carrying strap or the like is designed in one piece with the covering means, such that a low-cost manufacture is possible without additional fitted parts and handling of the camera under water is further improved. In addition, a good shock-absorbing effect for the camera is provided by the covering means.

In a further advantageous modification, the covering and carrying means are designed in one piece, i.e. they are provided using the multiple-component injection molding process on the body shells during a manufacturing process step, thereby achieving a particularly inexpensive manufacture. The design of the body in accordance with the invention further prevents any inadvertent opening of the camera by the user, since the locking means provided on the body shells are concealed by the shells in the connected state.

Another advantage during manufacture of a photographic camera made of a first and a second body shell of rigid polymer material which can be joined together and have openings for a taking lens and a viewfinder consists in that at least the body shell forming the camera front section is first moulded in a tool using a rigid polymer material and that in the same tool a covering layer made of an elastic polymer material is then connected to the body shell by chain looping of the polymer materials using the two-pack injection moulding process.

Better recyclability than in the prior art, and hence also better protection of the environment, is achieved in that the body shells are crushed without separation of the polymer materials using known devices, and the resultant material mix is used as an admixture for the manufacture of new camera components, with the admixture to the new polystyrene material being in a ratio not exceeding 25 parts by weight to 100 parts by weight. As a result, a greatly improved impact strength is achieved in the newly manufactured camera components when compared with polystyrene.

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

What is claimed is:

1. A watertight camera comprising:
    a film transport device;
    a lens;
    a flash unit;
    a viewfinder;
    a first and a second body shell of rigid polymer material, said first body shell forming a camera front section, said second body shell forming a camera rear section, said body shells being joined together to accommodate said film transport device, lens, flash unit and viewfinder, at least one said body shells having an edge disposed to define a joint between said body shells; and
    a seal of elastic polymer material on said edge, said seal being connected to said edge by molecular entanglement of said rigid and elastic polymer materials.

2. A watertight camera according to claim 1, characterized in that:
    said seal has an undeformed cross-section that is droplet shaped; and
    said second body shell has a circumferential groove, said groove being underdimensioned relative to said seal such that said seal is deformed when said body shells are joined together, whereby said body is watertight.

3. A watertight camera according to claim 1, further characterized in that:
    one of said body shells has a body opening for receiving said viewfinder, and said seal has an undercut associated with an edge of said viewfinder for a locking and sealing accommodation of said viewfinder.

4. A watertight camera according to claim 1, characterized in that one of said body shells has body openings, and shutter covers are associated with said body openings, said shutter covers being hinge-connected on one side to the body shell by a film hinge.

5. A watertight camera according to claim 4, characterized in that said camera has a film cartridge chamber and a battery compartment provided in the area of said openings.

6. A watertight camera according to claim 1, further comprising:

a cover comprising elastic polymer material on surface areas of said body shells and connected to said body shells by molecular entanglement of said rigid and elastic polymer materials.

7. A watertight camera according to claim 6, characterized in that:

said body shells define a surface when joined together; and said cover is provided on substantially the entire surface of said body shells exclusive of areas free of covering for gripping the body.

8. A watertight camera according to claim 6 characterized in that:

said body shells define a surface when joined together;

said first body shell is transparent;

said body further comprises a C-shaped information plate adjoining said first body shell; and said cover is provided on substantially the entire surface of said body shells exclusive of an opening over said information plate.

9. A watertight camera according to claim 6, further comprising a carrying means for holding the camera formed in one piece with said cover.

10. A watertight camera according to claim 9, characterized in that said seal, cover, and carrying means comprise a thermoplastic elastomer.

11. A watertight camera according to claim 10, characterized in that said thermoplastic elastomer is a styrene-butadiene or polyurethane.

12. A watertight camera according to claim 10, characterized in that said body shells and said seal, cover, and carrying means are formed from polystyrene and styrene-butadiene, respectively, or from polycarbonate and polyurethane, respectively.

13. A watertight camera according to claim 1, characterized in that said first body shell comprises an optically transparent polystyrene or polycarbonate, and said second body shell comprises a light-tight polystyrene or polycarbonate.

14. A watertight camera according to claim 1, characterized in that said camera includes a light-tight frame having a film supply and a film winding compartment, and a shutter; said lens being joined to said frame, said frame and at least one of said body shells having engaging elements connecting said frame to said body shell.

15. A watertight camera according to claim 14, characterized in that said engaging elements connect said frame to said body shell in lighttight relation.

16. A watertight camera according to claim 1, characterized in that said body shells include an integral lock, said lock being covered by said body shells when said body shells are joined together.

17. A watertight camera according to claim 16, characterized in that said first body shell has marked wall areas that can be cut through using a tool to unlock at least one of said locks.

* * * * *